June 9, 1959  M. WEISMAN  2,889,671
METHOD AND APPARATUS OF MAKING AND FILLING COFFEE BAGS
Filed Feb. 5, 1953  5 Sheets-Sheet 1

INVENTOR.
Maurice Weisman

June 9, 1959 M. WEISMAN 2,889,671
METHOD AND APPARATUS OF MAKING AND FILLING COFFEE BAGS
Filed Feb. 5, 1953 5 Sheets-Sheet 3
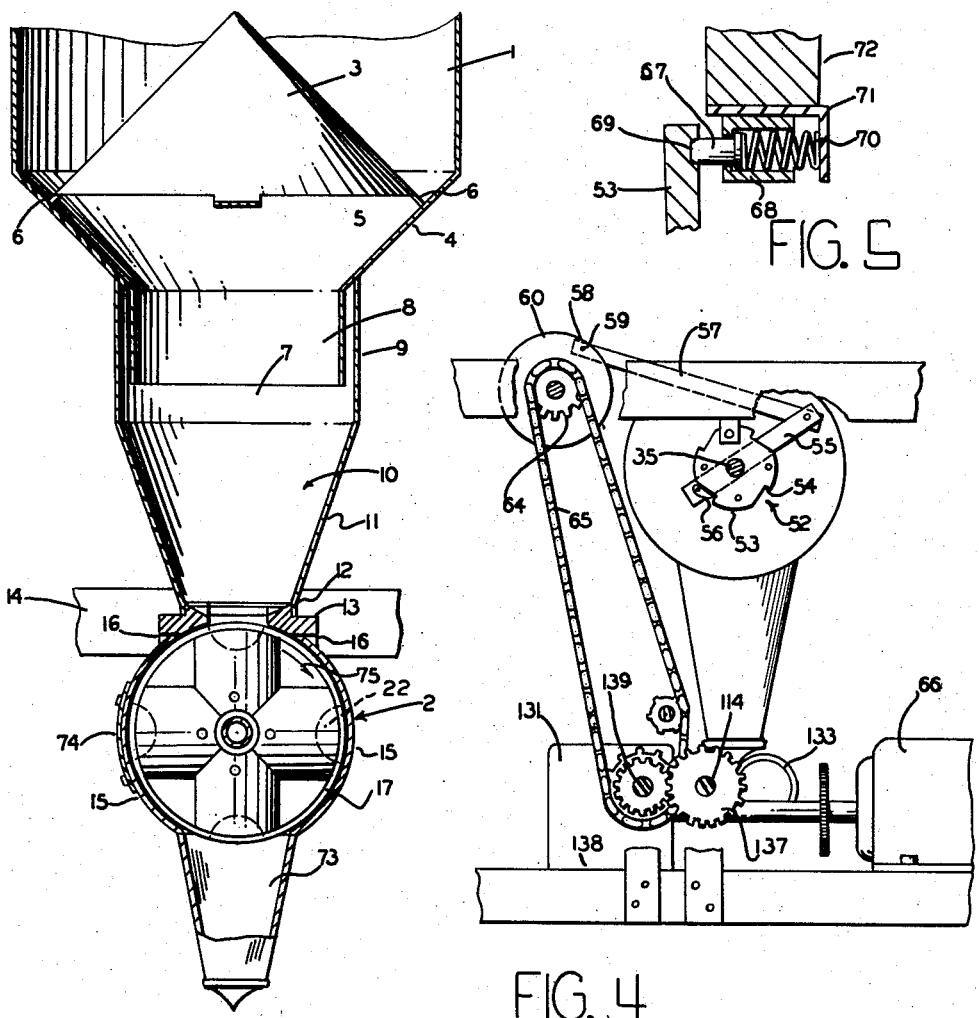
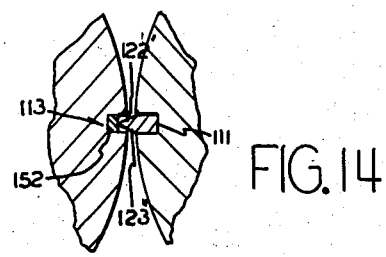
INVENTOR.
Maurice Weisman
BY

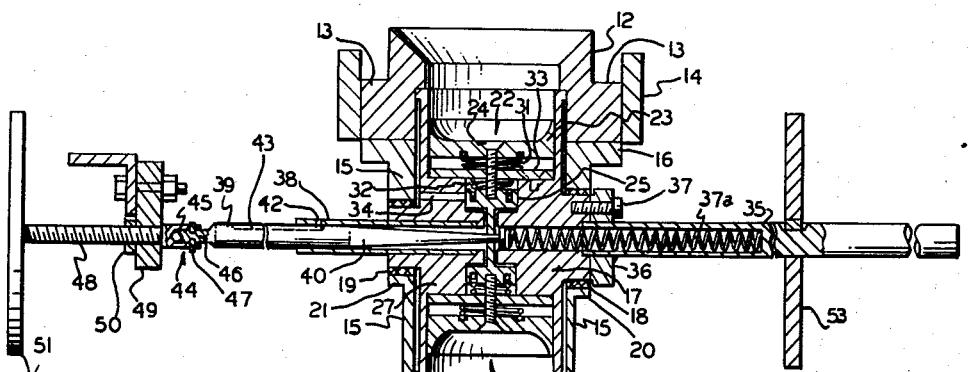

June 9, 1959  M. WEISMAN  2,889,671
METHOD AND APPARATUS OF MAKING AND FILLING COFFEE BAGS
Filed Feb. 5, 1953  5 Sheets-Sheet 5
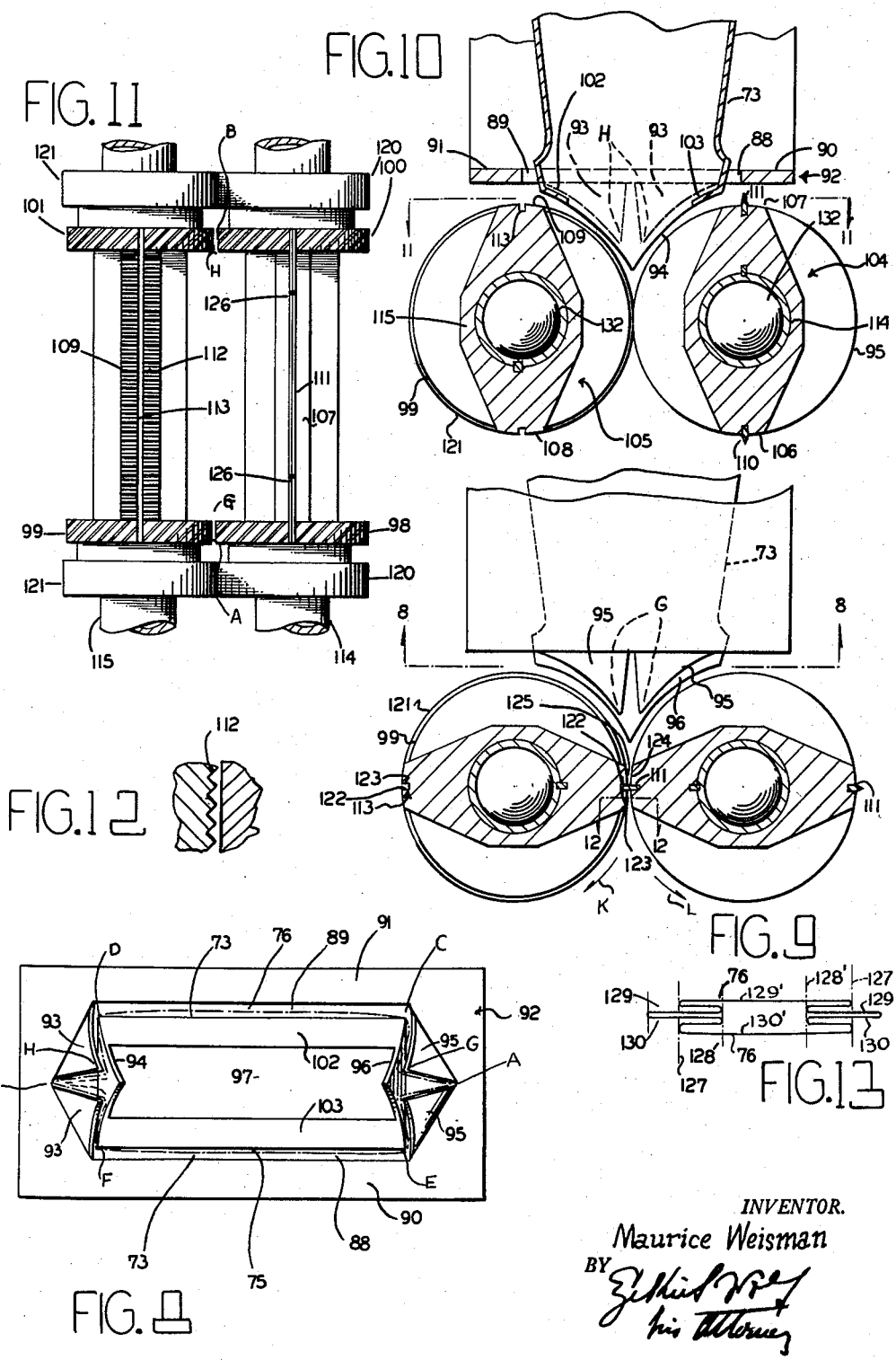
INVENTOR.
Maurice Weisman

United States Patent Office 2,889,671
Patented June 9, 1959

2,889,671

METHOD AND APPARATUS OF MAKING AND FILLING COFFEE BAGS

Maurice Weisman, Newton, Mass., assignor to Modern Coffees, Inc., Boston, Mass., a corporation of Massachusetts Application February 5, 1953, Serial No. 335,339

17 Claims. (Cl. 53—28)

The present invention relates to a machine and method of packing coffee in individual bags, but may also be applied to the packing of any other granular article to which it may be naturally used whether these be foods, hardware, chemicals or any other materials.

The invention has been particularly applied to the packaging of coffee where the problem arises of providing a bag which has a sufficiently large volume with minimum length, width and thickness dimensions so that it may be conveniently used in the ordinary coffee cup steeped in boiling water similarly as a tea bag.

In making tea with tea bags, the amount of tea which is ordinarily in the bag is usually not over fifty grains, whereas when the same process is used with coffee, the amount of coffee usually runs up higher than one-hundred and fifty grains. Due to the fact that the coffee will occupy a considerably larger volume of the coffee cup than the tea will occupy in the tea cup, it is necessary for successful use of a coffee bag in a cup to provide a bag which will still leave sufficient volume for the boiling water so that a normal cup of coffee may be had.

I have found that by constructing a coffee bag in the manner which will be described in the specification below, that sufficient room may be provided in the bag so that the coffee can be completely infused and the coffee flavor essence and soluble contents removed without affecting materially the volume or fullness of the cup as normally used.

One advantage is gained in the fact that coffee grounds themselves do not soak up as much boiling water as tea leaves normally do and this feature together with the fact that the bag in length and width dimensions is the same size as the tea bag, makes it possible to provide a successful coffee bag used for steeping an ordinary cup of coffee.

A further problem is the automatic manufacture and filling of the coffee bags in order that the cost of this service is sufficiently low so that it will not interfere with the normal sale of coffee put up in individual bags for steeping in single cups.

One of the objects of the present invention is to overcome the difficulties set forth above and pack coffee in individual bags which may conveniently and economically be used for steeping coffee in individual cups.

A further object of the present invention is to provide a method and manufacture of filling the coffee bags which will be continuous, rapid and provide accurate measuring of the amount of coffee which goes into each individual bag.

A further object of the present invention is to construct a bag in such a way that it will have sufficient interior space so that the grounds may be thoroughly wetted, infused, and so that the soluble matter in the grounds may be completely extracted in a very short time.

A further object of the present invention is to provide a method of making and filling the bags in substantially simultaneous operation under highly sanitary conditions, wherein the coffee not only is not exposed but in no way comes in contact with the human hands.

A further object of the present invention is that the dimensions of the bag may be readily controlled dependent upon the amount of coffee which one desires to put into the bag.

A further object of the present invention is the accurate filling of each bag by means of a measuring device which remains in a fixed position, which measuring device is divided into a plurality of compartments, the chambers of which are accurately controlled and adjusted for all compartments.

A further object of the present invention is that the bag is formed with thermo-plastic webs which are fed in continuous strips and which are filled, sealed and cut in such a manner that the strips of the web are continuously held in definite fixed positions during the entire operation.

Other and further advantages and features of the method and the machine will be more fully understood from the description in the specification set forth below, particularly relating to details of feeding the paper web, filling the bags, sealing the bags, severing or partly severing the bags one from the next and delivery for semiautomatic or automatic packing.

The invention will be more fully understood when the specification is read in connection with the drawings illustrating an embodiment of the same, wherein:

Figure 3 shows a detail in fragmentary elevation of the volumetric measuring means and the feeding hopper.

Figure 4 shows a detail of the operation of the device shown in Figure 3.

Figure 5 shows a detail of an element shown in Figure 4.

Figure 6 shows a detail taken substantially along the line 6—6 of Figure 2.

Figure 6a is an enlarged detail of a portion of Figure 6.

Figure 7 shows a detail taken substantially along the line 7—7 of Figure 1.

Figure 8 shows a view looking up from the bottom of Figure 6 in the region shown by the lines 8—8.

Figure 9 shows an enlarged section taken substantially on the line 9—9 of Figure 1 with certain elements however in different positions of operation.

Figure 10 shows a view similar to that of Figure 9 with certain elements in different positions from that shown in Figure 9.

Figure 11 shows a view substantially taken on the section lines 11—11 of Figure 10 with parts of certain guide elements omitted.

Figure 12 shows a fragmentary section taken substantially along the line 12—12 of Figure 9.

Figure 13 shows a diagrammatic section taken along a transverse sealing edge of the bag manufactured by the machine, and, Figure 14 shows an enlargement of the blade and platen on the sealing rolls.

Figure 1:
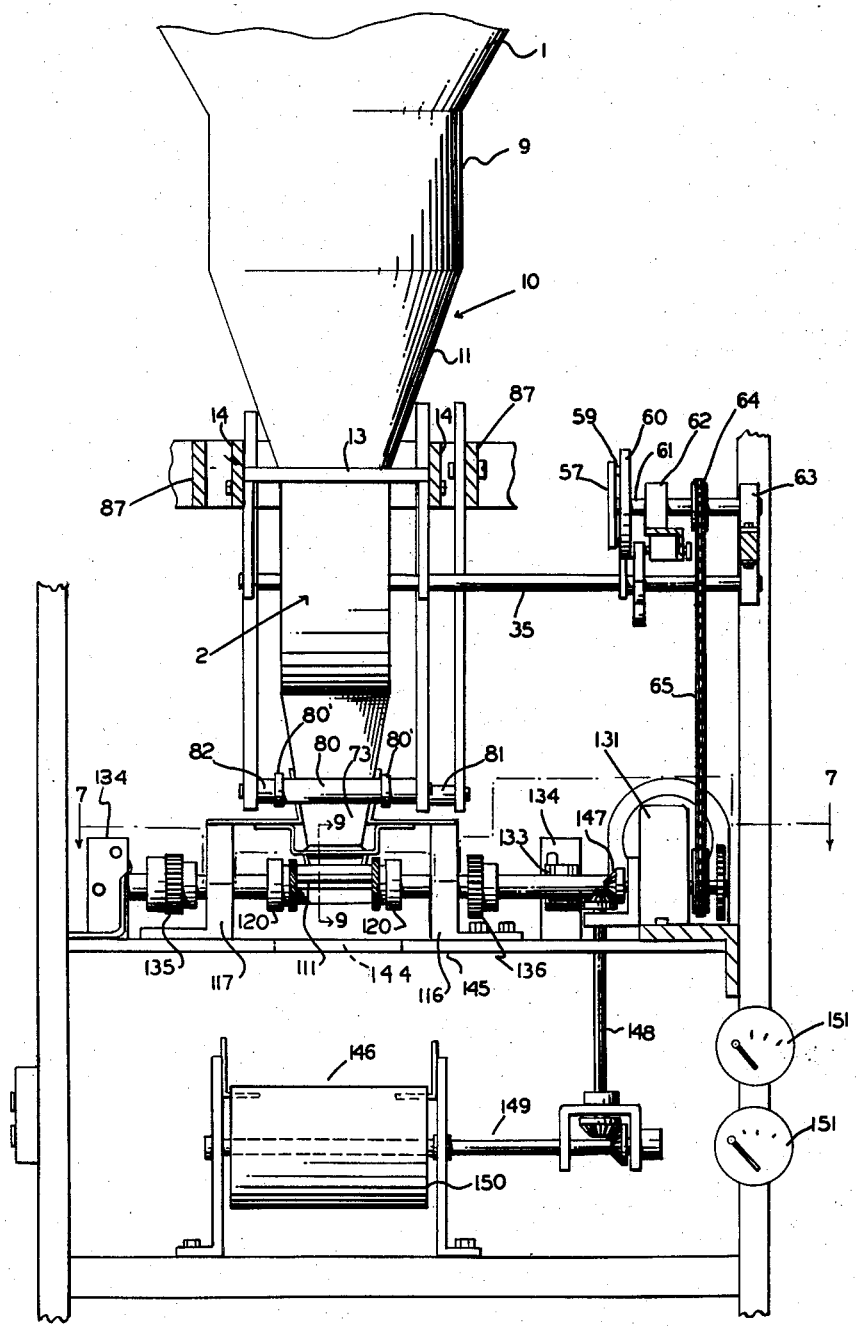
Figure 1 is an elevation of the machine with a portion shown in fragmentary section.

Referring to the drawings, the coffee is fed into the hopper 1, Figure 1, and falls by gravity or is fed into the measuring chamber 2. In its descent into the chamber 2, the flow is evenly distributed within the hopper 1 by means of a conical or a pyramid shape baffle 3 in the top of the hopper which compels the coffee to flow between the walls 4 of the hopper and the peripheral edge 5 at the lower end of the baffle. A plurality of supports 6 hold the conical baffle 3 in place and permits the coffee to flow slowly along the inner walls 4 of the hopper through the throat 8 at the bottom of the hopper into the chamber 7 formed at the lower end of the hopper by means of an enclosing wall 9 which is spaced from the throat wall 8 of the hopper. To this arrangement a substantially constant head is maintained over the measuring chamber 2, as under most conditions, the coffee does not stand higher than the throat 8 of the hopper when in use and in any event not higher than the pyramid or cone 3.

At the lower end of the hopper below the throat 8, there is a funnel section 10 enclosed by walls 11, the lower end of which fits about a shoulder 12 in a plate 13 which is supported by frame supports 14 shown in cross section in Figure 1.

The device for measuring the coffee generally designated as 2, see Figure 3, has an outer shell 15, which is generally cylindrical in shape except for the top portion which has a flange 16 which fits to the lower surface of the plate 13, previously mentioned.

Within the walls of the cylindrically shaped shell 15 there is journaled a barrel or spider 17 which has aligned axial bearing elements 18 and 19 at its ends, which are supported in bearing supports 20 and 21 which extend through the walls of the shell 15. The barrel or spider 17 is provided with four similar recesses or chambers 22, radially spaced at 90° from one another about the barrel. Each of these chambers or recesses provides the correct volumetric measurement of the number of grains of coffee to be used for each bag by means of an adjusting arrangement by which the size of the chamber is varied. For this purpose a cup 23 has a close sliding fit within each of the chambers. This cup, is, at its center, secured by means of a screw 24 to a short rod 25, slidable with the cup in a recess and guide 26 in the hub 27 of the spider. The hub 27 is provided with slots radially positioned at 90° with reference to the spider axis or bearing 18 and through these holes 28, there extends fingers 29, which fingers extend from the bottom of the rod 25. There is a cup in each of the chambers 22. Between the cup 23 and the rod 25 as indicated in Figure 6, there is a disc 30, and bearing against this disc, on either side, are helical springs 31 and 32 respectively, which serve to take up loose play and other adjustments in the adjustment in the cup to the rods with the fingers extending from the very bottom. The position of the cups may therefore be accurately adjusted one with the other.

The plate or disc 30 may be locked down in place by screws 33 and to prevent the rod 25 from turning, a pin 34 may serve as a key engaging a key-way in the side of the rod.

It will also be noted that this construction prevents the dust which may gather in the cup from sifting down through the holes 28 into which the fingers 29 extend. The hub of the spider is fixed to the shaft 35 by means of a plate 36 which is bolted to the face of the hub by bolts 37, the plate itself being secured to the shaft by welding the shaft to it where it passes through the plate.

In the region of the hub and extending beyond it, the shaft 35 is bored to receive a spring 37a and this spring extends through the shaft into the hub coinciding with the axis of the hub. The hub on its other side, that is as viewed at the left of Figure 6, is bored to receive a hollow cylindrical shaft or tube 38, coaxially positioned and aligned with the bore in the other half of the hub 27. Through this cylindrical hollow tube there extends and is slidingly fitted, a rod 39 which has a decreasing tapered section 40 in the portion which extends through the hub which decreasing tapered section terminates in a piston 41 acting against the spring 37a within the axial bore in the hub. The rod 39 is keyed to the tube 38 by the pin 42 in the tube and the key-way 43 in the rod 39. The tube 38 has a forced fit in the hub 27 so that the rod 39, the tube 38 and the hub all rotate together with the shaft 35 acting as the driving shaft. Coupled to the rod 39 which terminates in the tapered pin 40, is the means for adjusting the position of the cup element 23. For this purpose the rod 39 terminates in a thrust bearing 44 which comprises a recessed tube 45 into which a reduced end 46 of the rod 39 extends. This end 46 is held in place by a yoke 47 which engages an annular groove in the side of the end 46 of the rod 39. The recessed tube 45 is therefore free of the tube 39 insofar as rotation is concerned and therefore may remain stationary as the tube or rod 39 is rotated. However the rod 39 may be adjusted longitudinally on itself by means of the recessed tube 45 through the threaded shaft 48 which threads through the supporting block 49, but is locked in place by means of the lock nut 50 so that when the handle or knob 51 is adjusted for the desired volume of coffee grounds which the cup will receive it may be locked in position and will remain that way until a new adjustment is desired.

The tapered end 40 of the rod 39 engages the fingers 29 at the base of each cup and as the handle 51 is screwed inward, the enlarging section of the taper 40 will force the cups outward in each cavity or chamber exactly the same amount so that each cup will measure accurately the same amount of coffee.

Initially the cup volume will be adjusted for each cavity by adjusting the position of the screw 24 so that each cup is in relatively the same position, measuring the same coffee volume.

The spider 17 is rotated and stopped with successive cups positioned in alignment with the orifice within the shoulder 12 below the funnel 11. This intermediate start and stop rotation is provided to the shaft 35 by the cam and pawl arrangement generally designated 52, see Figure 4.

Secured to the shaft 35 is a cam 53 having notches 54 at 90° from one another around its periphery. Pivoted freely on the shaft 35 is a lever arm 55 which has a spring tensioned pawl 56 engaging in the notches 54 in the cam. The pivoted lever arm 54 is linked to a second lever arm 57 which has its other end 58 freely secured by the pin 59 to the cam disc 60. The cam disc 60 is axially mounted and secured to the shaft 61, journalled in the bearings 62 and 63 as shown in Figure 1. The shaft 61 is turned by a sprocket 64 driven by a chain 65 which derives its power through the gearing shown at the bottom of Figure 4 and at the right hand portion of Figure 1 from a common motor 66 which operates the entire mechanism. The cam 53 when it turns one notch, brings the next chamber or cup beneath the orifice ready to be filled with a cup volume of coffee.

One complete revolution of the cam 53 corresponds to one complete revolution of the spider within the chamber 2. The motor 66 is also geared to fit the paper so that the new bag is formed ready to receive the contents of one cup as the cup is rotated to a downward extending position as viewed either in Figures 1, 3 or 6. This will be more fully described later in the specification.

It will be noted that the movement of the lever 55 is a reciprocal movement and that during the time interval it takes to move the pawl 56 from one notch 54 to the next successive notch, that during this time the cups will be in a position of rest so that the upright cup may be filled during that interval.

The measuring device is adjusted so that at its position of rest, one cup will always be in an upright position beneath the open orifice to receive the coffee. It will also be noted that the time interval at which the cup remains at rest is ⅛ of a revolution of the spider. This may be changed by using a motion in which the movement of the lever will be more rapid in one direction of rotation than in the other, such for instance, as a Geneva movement or as so called Whitworth quick return motion. However it has been found that the crank arrangement shown in Figure 6 is preferable because the speed of the hub or drum is not decreased but stopped suddenly so that the coffee is jarred out of the chamber by impact, clearing the chamber fully and permitting high speed operation.

If it is desired to fill more than four cups in one revolution of the spider, a more rapid intermediate motion to bring successive cups into the filling position may be desirable.

To prevent the disc 53 from slipping when the lever arm 55 is being moved over the surface of the disc, a spring tension pin arrangement is employed as shown in Figure 5. This comprises a pin 67 which projects through an opening in a housing 68 and is forced against a recess 69 in the disc 53 by means of a spring 70 backed by an angle plate 71 which in turn is attached to the frame member 72.

After the coffee is measured out by means of the volumetric device 2, it is delivered at the bottom of the volumetric device into the outlet funnel 73. It will be observed, referring to Figure 3, that when one measured volume of coffee is being delivered at the bottom, another measured volume of coffee in the volumetric device in one of the horizontal directions is full and in the other horizontal direction is emptied. There is a cover plate 74 provided in the outside shell which may be removed for cleaning out the empty cup of dust or other particles which may have collected. The arrow 75 indicates the direction of rotation of the measuring device.

The outlet funnel into which the coffee falls is provided at its bottom end with an opening which has a set of guide plates or forms over which the paper web passes into the forming and sealing means by means of which the bag is made.

In the present invention the bags are preferably made of thermo-plastic paper webs which may be heat sealed together to form the bag holding the ground coffee. These web sheets as will be seen are fed in a continuous fashion from web rolls and are sealed along the bottom and sides just prior to the filling of the bag and then sealed across the top of the bag and cup subsequent to the filling after which the bottom seal is quickly made for the next successive bag.

The paper bags preferably have sufficient wet strength to withstand boiling water immersion and also have sufficiently large interstices in the forming web so that substantially all of the coffee grounds may be retained in the coffee bag after the bag has been wetted and removed.

Figure 2:
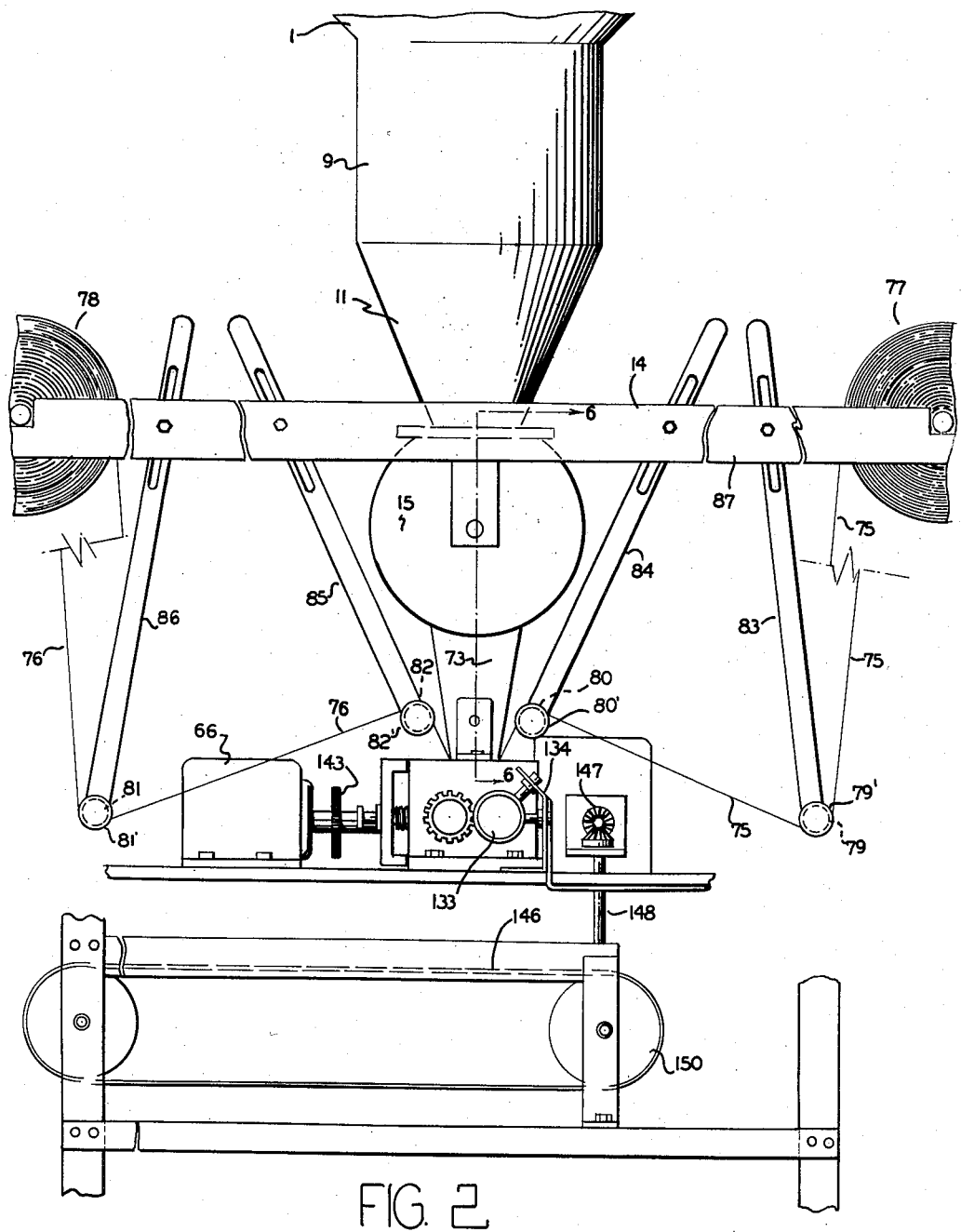
Figure 2 shows a side view of the machine referred to in Figure 1 with portions in fragmentary section.

Figure 2 shows the manner in which the paper webs are fed into the machine. The web sheets 75 and 76 come from rolls 77 and 78 respectively. The sheet 75 travels over rollers 79 and 80 while the sheet 78 travels over the rollers 81 and 82. These sheets are guided laterally by end discs 79' and 80', 81' and 82' respectively, whereby the webs are accurately aligned as they come into the forming devices about to be described.

The rolls 79, 80, 81 and 82 are respectively supported by bars 83, 84, 85 and 86, which may be adjustably positioned and secured to the frame brackets 14 or 87 (see Figures 1 and 2) as the case may be. From the guide rolls 80 and 82, the paper is fed into the slots 88 and 89 which actually is the opening between the sides 90 and 91 of the preformer plate 92 and the sides of the lower end of the funnel 73. The paper web as it comes into the slots 88 and 89, is indicated by the dotted lines 75 and 76 respectively. From Figure 8, it is clear that these webs are carried into openings 88 and 89 with the side portions extending between said guides 93 and 94 on one side (the left as indicated in Figure 8) and on the other side by plates 95 and 96. Each web is fed in the same way. The guides 94 and 96 actually do not serve to any great extent in the guiding of the web but keep the coffee from coming in contact with the web and interfering with the proper pleating of the web as will be seen later.

The guides 94 and 96 come to a center point at about the center of the lower end of the opening 97 of the funnel 73 and actually extend from the side walls of the funnel 73. There are two guide plates or paper formers 95 and also two paper formers 93, one set being on each end of the preforming opening.

From Figure 10 it will be noted that the paper formers 93 have a peripheral edge which follow an arcuate contour with the side sealing circular bands 98 and 99 which mesh to seal the bags along their sides. Each of the paper former elements 93 and 95 serve to fold the paper over on itself in proportion to the formation of the pleats in the making of the paper bag. The side edges of the sheets 75 and 76 respectively at the points A and B (Figures 8 and 11) are gripped by the sealing bands 98, 99 and 100 and 101 respectively. Actually the point of gripping as viewed in Figure 8, is not in the plane of the paper but as shown in Figure 8, above the plane of the paper but directly in line or perpendicular to the points A and B. The gripping of the web or paper in this manner tends to draw the paper webs 75 and 76 tightly around the corners C, D, E and F, Figure 8, so that a positive pleating is formed, in the webs of the bag as the bag is being formed by the webs moving downward in the machine.

It will also be noted that the lower end of the funnel 73 is provided with two longitudinally extending lips or flanges 102 and 103 which directs the coffee downward and makes the opening through which the coffee descends substantially the thickness of the bag which is ultimately formed keeping the coffee away from the web.

It has been pointed out in connection with Figures 8 and 11, where the points A and B of the edge of the webs terminate, the inner points G and H of the paper former element 93 and 95 terminate somewhat within the sealing bands 98, 99, 100 and 101 in positions indicated by letters G and H in Figures 8 and 11. The position of these points in a large measure determine the width of the side pleats together with the position of the points C, D, E and F.

Where a constant width of web is being used, the location of the points C, D, E and F, determine to a large extent the width of the pleat on the bag and also tend to locate how the pleat is sealed transversely across the bag at the ends.

To continue with the method of making and filling the bags, attention has already been directed to the fact that the surface of the bands or rollers 98, 99, 100 and 101 serve to seal the side edges of the bag. This sealing means will be described more particularly in connection with more detailed views shown in Figures 7, 9, 10, 11 and 12.

The sealing device shown in the figures mentioned above include two rotatable formers, 104 and 105, which as indicated in Figure 10 have a cross section which is substantially elongated in one diametrical direction and substantially reduced in the diametrical direction 90° to the first direction. The long diametrical direction terminates in two arcuate surfaces 106 and 107 for the former 104 and 108, and 109 for the former 105. All of these arcs should be circular or very nearly circular and all have the same circular diameters. In each of the surfaces 106 and 107, there is secured longitudinally across the former, knife edges 110 and 111 which are diametrically opposite each other. The surface of the arcs 106 and 107 just opposite these formers are smooth. The arcs 108 and 109 of the former 105 are serrated as indicated by the surface 112, Figures 11 and 12. A groove 113 is formed in the serrated face 112 and this groove is adapted to engage the knife 111 as the formers are rotated one in clockwise and the other in counter clockwise directions. As the faces 107 and 109 come together and the knife blade 111 engages in the groove 113, the two formers are forced slightly apart from each other due to the fact that the knife blade 111 projects slightly greater than the depth of the recesses 113. The formers 104 and 105 are supported on shafts 114 and 115 respectively to which they are secured. These shafts 114 and 115 turn in bearing supports 116 and 117 with the bearing for the shaft 115 spring tensioned by means of the springs 118 and 119 in such a manner that as the knife blade 111 engages the groove 113, the two formers 104 and 105 are slightly separated one from the other by the movement of the shaft 115 against the spring exerting a compression thereof.

In fact it should be noted that the bands 99 and 101 which are knurled on their surfaces, are of the same diameter but slightly smaller than the knurled circumference of the bands 98 and 100. This is to allow for the slight thickness of paper in the sealing of the side bands. It will of course be noted that some compression is exerted on the side edges of the web since opposite bands are somewhat pressed together by the tension of the springs 118 and 119. Engaging rollers 120 and 121 at either end of the formers maintain a slight separation between the bands 98 and 99, and 100 and 101, which of course are separated slightly less than the normal thickness of the paper webs which come together between the sealing side bands. The shafts 114 and 115 are hollowed out to receive a heating unit which heats both the bands 98 and 99, 100 and 101, and the transverse crimping, sealing and cutting elements. These heating means will be mentioned below.

The transverse surfaces 107 and 109 have the same radii from the center of the former, but this radius as will be seen from Figure 10 is slightly larger than the radius of the side sealing bands 99 and 101. Therefore when the surfaces 107 and 109 come together, the webs are gripped together chiefly by the engaging surfaces 107 and 109. As the knife blade 111 engages the transverse slot 113, these two surfaces 107 and 109 are separated slightly against the tension of the springs 118 and 119, but as indicated in Figure 9, the knife blade 111 holds the webs together just on the upper surface of the knife as indicated at 122, while cutting the bag from the webs on the lower surface of the blades at 123 as viewed in Figure 9. Immediately after the bag is severed from the webs and while the end of the web is hooked around or in between the knife and the groove, the two formers rotating in the direction of the arrows K and L, bring the opposing webs together between the transverse sealing surfaces 107 and 109 on the upper sections 124 and 125 as seen in Figure 9. The transverse sealing is effected by this action which seals one edge of each bag with a tight flat marginal seal transversely across the bag with a cross sectional shape having a hook form. This is at the very edge of the bag and above this seal is the transverse crimping or sealing of the width equivalent to the surface 124 and 125 just mentioned.

As will be noted from Figures 9 and 14, the knife blade 111 is so set that it stretches the fibers along the line of the knife edge and the under surface 123' of the blade as the blade bears against the edge of the groove 113, while the upper surface 122' of the blade element is sufficiently close to the upper surface of the groove to hold the webs together until the sealing of the transverse surfaces is effected. In the base of the groove 113, a small flat strip 152 is set which has been called a platen, and which is of softer material than the blade itself. This platen is of stainless steel and hardens with wear effecting a lapping between the blade and the platen. The edge of the blade acting against this platen provides cutting, shearing and/or melting action which severs the web transversely in the position shown in Figure 14.

Since the engagement of the knife blade and the groove have very small tolerances since not only is the web very thin but the action effecting a thermo-plastic seal is such that the web is simultaneously squeezed and deformed with heat, it has been found that by making a knife blade 111 and the platen fitted into the groove 113 of different materials, that it is possible to lap or seat the knife blade accurately into the groove. While various metals may be used for this purpose, I have found that by making the platen of stainless steel which initially is slightly softer than the steel of the blade 111, that the blade will wear into the groove in the desired manner. The platen has been made of .302 or .303 stainless steel with a 50 Rockwell hardness which upon being used for a short time in connection with the blade, becomes substantially as hard as the blade which has a Rockwell test of 62 to 64. In this manner the imperfections relating to cutting the blade and groove are eliminated. Other combinations of metals may be used, the essential point being that the platen in the groove should be lapped to the blade and should become substantially as hard as the blade after a short working period.

The blade 111 if desired may be provided with slots 126, in which the case the bags will not be completely severed but will be joined by a very thin connection between two adjacent ends as the bags leave the machine.

Since there are two grooves and two blades in each of the sealing and cutting formers or elements, one blade could sever the bag completely from the webs while the next blade could be provided with slots 126 so that pairs of bags may be connected together. This permits ready packaging and handling both in pairs and singly.

It must also be noted that the paper formers 93 and 95 form side pleats in the bag and that these side pleats are permanently fixed by the transverse sealing across the bag.

Referring to Figure 13 which shows a section through the transverse seal at one end of the bag, it will be seen that six thicknesses of web come together between the dotted lines 127 and 128. These six thicknesses are all sealed together in face to face relationship as are also the side edges 129 and 130, which of course extend down the sides of the bag as well as the center portion 129' and 130'. The pleats therefore are firmly retained in place at both ends of the bag and between these ends the pleats are pushed out depending upon the amount of coffee poured into the bag.

As far as the time sequence is concerned, this is all controlled and operated as has been mentioned above from the motor power source 66, Figures 4 and 7.

Referring to Figures 7 and 1, the motor 66 drives a reduction gear 131 which in turn drives through a gear system the shaft 114 for driving the bag forming element. Both shafts 114 and 115 are internally hollow and have heating cartridges 132, Figure 10, inside of them within the forming units 104 and 105. Current is supplied to these heating units by means of the slip rings 133, see Figure 7, which in the shafts 114 and 115 respectively to which current is fed by the brush sets 134, 134.

Referring again to the driving mechanism, the shaft 114 in turning a complete revolution completes two bags. The shafts 114 and 115 are geared together at both ends by inter-meshing gears 135 and 136 which have a one-to-one ratio. For each half revolution of the shaft 114, one cup containing the measured amount of coffee is emptied into a bag as it is formed.

When the cup comes to its lowest position, the bag to be filled has an open top, the sides and bottom already completely formed. It is evident that merely by synchronizing the operation of the measuring device and the operation of the forming device, that the proper timing sequence will follow.

The relationship of the rotation of the measuring device and the forming device is positively operated synchronously since the gear 137 which drives the shaft 114 is driven from the gear 138 which is on the shaft 139 extending from the reduction gear box 131. The shaft 139 carries the sprocket wheel 140 which drives the sprocket chain 65 which controls the operation of the measuring device.

It is readily seen that while these devices may be locked in position, slight annular adjustment can readily be made so that the proper phase synchronism can be obtained exactly so that when the coffee bag is formed and ready to be filled, the coffee will be poured into it as the measuring device turns a cup to face the outlet of the funnel 73.

On the drive shaft at 141 from the motor 66 there is provided a clutch 142 and a wheel 143 so that the system may be hand turned simply for controlling adjustment, threading of the web, cleaning of various parts or other utility purposes.

When the coffee bags have been filled and when they are severed from the web, they drop down from one former and fall through opening 144 on the platform 145 supporting the machine on to a table or conveyor 146. If a conveyor is used the conveyor may be made to travel by means of the motor drive previously described by means of a pair of beveled gears 147 supported on a rotatable shaft extending from the gear box which in turn drives the shaft 148 and the shaft 149 to which the conveyor 150 is secured.

The conveyor 146 may be moved at such a speed that the bags are deposited at desired spaced intervals on the conveyor, or the conveyor 146, if desired, may be operated through an intermediate drive so that a number of bags will be piled up on the conveyor at spaced intervals.

In view of the fact that the whole system is geared together, it is possible to pile up a given number of bags in a pile at spaced intervals along the conveyor, and in this way the desired number of bags will automatically be counted for packaging purposes.

The devices 151 and 152 indicated in Figure 1 are individual controls for the cartridge temperatures so that accurate heating of the formers may be maintained.

In the above description, the machine has been described in connection with forming and filling the bags continuously from a set of webs brought into opposing relation one to the other. The same principles which have been described in connection with the machine set forth above may also be used with slight modifications for making a double set of bags thereby doubling the output of the embodiment described herein. In this case devices measuring the amount of coffee used for the bag, the guide chutes and the pleat forming devices will all be repeated as elements adjacent to the same elements of the device making a single set of bags and filling the same. Where two rows of bags are to be made, the sealing and cutting rolls shown in Figure 11 will comprise two pair of engaging spacer rolls 120 and 121 between which there will be two sets of sealing and cutting means, each coaxially on the same shaft with two sets of side sealing bands 98 and 99 adjacent one another but spaced a sufficient distance apart from each other to allow for the insertion of a cutting blade, which should extend upward to a point just above the position indicated by B, Figure 8. This is the position with reference to the web just as the web is being drawn into the forming plate which preform the pleats.

It should also be noted that the forming plate shown in Figure 8 will have to terminate in the open slot between the two downwardly extending triangular plates 93 and that the other half of the web will be similarly threaded around adjacent guide plate as shown in Figure 8, except for the modification just mentioned.

The present machine is particularly adapted for the packaging of ground, roasted coffee, whatever the particle size of the ground coffee may be.

Various types of paper webs may be used for the formation of the bag in the present machine and by the present method.

A common type of web which may be used by the present method and in the present machine is a thermoplastic paper web sealed by heat and pressure or the web may be non-thermoplastic in character and be sealed only by pressure means in which adhesives may or may not be employed. Where the bags are thermo-plastic sealed by heat and pressure, it will be necessary to apply heat to the sealing elements and heat is also applied for the cutting and severing means such as the groove and blade above described.

Either type of web may be used in the methods and machine described in the present invention.

Having now described my invention, I claim:

1. A method of making and filling individual coffee bags in a continuous process which comprises feeding continuous strips of thermoplastic paper webs, preforming the sides of each web gradually into a set of open pleats with parallel peripheral edges, forming the bottom of a bag by thermoplastically sealing said webs together transversely in face to face relation with the formed pleats secured in place between the sealed portions of the webs, drawing the peripheral side edges of the webs into face to face relation and thermoplastically sealing the same at least along a portion of their sides forming a bag open at one end, filling the open bag through said opening with a predetermined measured quantity of coffee, thereafter forming the top of the bag by thermoplastically sealing said webs together transversely in face to face relation with the formed pleats secured in place between the sealed portions of the webs that form the top of the bag, and finally severing the bag from the strips prior to the forming of the next seal for the bottom of the next successive bag.

2. A method of making and filling individual coffee bags in a continuous process which comprises feeding continuous strips of paper webs having adhesive means for sealing the webs in face to face relation, preforming the sides of each web gradually into a set of open pleats with parallel peripheral edges, sealing said webs together in face to face relation transversely across the webs securing the formed pleats in place, drawing the peripheral side edges of the webs into face to face relation and sealing the same at least along a portion of their sides forming a bag open at one end filling the open bag through said opening with a predetermined measured quantity of coffee, thereafter completing the sealing of the sides and the open end of the bag transversely across the bag and thereby securing the pleats at their other end and finally severing the bag from the strips prior to the forming of the next seal for the bottom of the next successive bag.

3. A method of making and filling individual coffee bags in a continuous process which comprises feeding continuous strips of paper webs, preforming the sides of each web gradually into a set of open pleats spaced away from the side edges a shorter distance than from the middle of the webs, sealing said webs in face to face relations transversely across the web securing the formed pleats in place across the bottom of the bag in a region spaced from the sides of the webs and from the center region, sealing the webs together at the sides, filling the bag and completing the sealing at the sides and across the top of the bag, said sealing across the top of the bag securing the ends of the pleats in the same positions as across the bottom of the bag.

4. A method of making and filling individual coffee bags in a continuous process which comprises feeding two continuous strips of paper webs, preforming the sides of each web gradually into a set of open parallel pleats adjacent the sides of the webs, making the bottom of a bag and securing the formed pleats in place by transversely sealing the two webs together, sealing the webs together at the sides, filling the bag and completing the sealing of the bag at the sides and across the top of the bag.

5. In an apparatus for making and filling individual coffee bags, means for feeding a pair of paper webs in continuous strips into substantial face to face relation, means for forming opposing side pleats in each of said webs spaced from the peripheral edges of the webs while being fed into face to face relation, means included in the feeding means of said web comprising a pair of sealing rolls having edge engaging sealing rings for sealing the peripheral edges of said webs and centrally recessed sections elongated in one diameter with surfaces adapted to engage one another, upon rotation, said surfaces including a blade extending from one face engaging a groove in the face of the opposing surface of the other roll of the pair, the surfaces on either side of said blade and groove together with said blade and groove adapted to form a transverse seal on the bottom and top of adjacent bags and at least partially severing adjacent bags.

6. An apparatus for making and filling individual coffee bags comprising means for feeding a pair of paper webs in continuous strips into substantial face to face relation, means for forming opposing side pleats in each of said webs spaced from the peripheral edges of the webs while being fed into face to face relation, means included in the feeding means of said web comprising a pair of sealing rolls having edge engaging sealing rings for sealing the side peripheral edges of the webs and connected intermediate sections elongated in one diametrical direction to the same diameter as the sealing ring for sealing the ends of the bags and shortened at right angles to it between which the webs are adapted to pass, means for feeding and measuring a predetermined quantity of coffee, means for delivering the measured quantity of coffee into a coffee bag being formed and means for actuating the web feeding and sealing means and the coffee measuring and delivery means in cyclic phased operation whereby a coffee bag is made, filled and sealed.

7. An apparatus for making and filling individual coffee bags comprising means for feeding a pair of paper webs in continuous strips into substantial face to face relation, means for forming opposing side pleats in each of said webs spaced from the peripheral edges of the webs while being fed into face to face relation, means included in the feeding means of said web comprising a pair of sealing rolls having edge engaging sealing rings for sealing the side peripheral edges of the webs and connected intermediate sections elongated in one diametric direction to the same diameter as the sealing ring for sealing the ends of the bags and shortened at right angles to it between which the webs are adapted to pass, means for feeding and measuring a predetermined quantity of coffee comprising a drum having spaced cups recessed in the surface of the drum, means for rotating said drum in step by step motion corresponding to the spacing of said cups, means for delivering from said cups when each has reached a specific position, the coffee therein into a bag being formed, and means for actuating the web feeding and sealing means and the coffee measuring and delivery means in cyclic phased operation whereby a coffee bag is made, filled and sealed.

8. In an apparatus for making and filling individual coffee bags, means for feeding a pair of paper webs in continuous strips into substantial face to face relation, means for forming opposing side pleats in each of said webs spaced from the peripheral edges of the webs while being fed into face to face relation comprising a guiding frame having a point establishing an inner line of the pleat lengthwise of the bag and a point establishing an outer line of the pleat lengthwise of the bag, means including in the feeding means of said web comprising a pair of drawing and sealing rolls for drawing said webs through said guiding frames and effecting lateral seals of said webs and transverse seals sealing said pleats at the ends of said bags being formed.

9. In an apparatus for making and filling individual coffee bags, means for feeding paper webs in continuous strips into substantial face to face relation, means for forming side pleats in said webs while being fed into face to face relation comprising a guiding frame, having an elongated orifice through which the coffee is passed to fill the coffee bag formed by a substantially rectangular frame section with means providing a surrounding slot through which opposing webs are drawn and means forming triangular surfaces projecting inwardly of the outer sides of the slot near the midportions of the sides of said slot serving to establish the inner line of fold of the pleats with the corners of the rectangular frame serving to form the outer line of fold of the pleats in said paper webs, means including in the feeding means of said web comprising a pair of drawing and sealing rolls for drawing said webs through said guiding frames and effecting lateral seals of said pleats at the ends of said bags being formed.

10. In an apparatus for making and filling individual coffee bags, means for forming the coffee bag with side pleats therein comprising a forming guide for a pair of continuously fed paper webs providing a substantially rectangular slot in a plane, a pair of guide plates projecting in a downward direction with respect to said plane from the outer sides of said rectangular slots, having a substantially triangular shape, said plates forming a guide slot extending outward in the midsection of the sides of said rectangular slot providing a guide line for the inner pleatline of said bag, each of said paper webs being drawn over one of said long sides of said rectangular slot with the side sections of said webs being drawn along the short sides of said rectangular slots and between the sides of said triangular shaped plates whereby the webs are formed with pleats on each side.

11. In an apparatus for making and filling individual coffee bags, a coffee delivery chute having a downwardly opening orifice, means providing a substantially rectangular shaped slot guide normal to the direction of coffee delivery for opposing paper webs drawn therethrough for forming the coffee bags, means for drawing said webs therethrough providing a grip transversely across the whole web, means extending downward at the ends of said slot symmetrical with a plane through the midsection of the slot guiding the side portions of said web inward of the corners of said slot whereby as said web is drawn a pleat will be formed therein at each side thereof.

12. In an apparatus for making and filling individual coffee bags, a coffee delivery chute having a downwardly opening orifice, means providing a substantially rectangular shaped slot guide normal to the direction of coffee delivery for opposing paper webs drawn therethrough for forming the coffee bags, means for drawing said webs therethrough, said rectangular guide slot having downwardly and inwardly extending similar end guide plates forming a second slot extending outwardly at the middle of the ends of the rectangular guides, the ends of said second slot having a position over the ends of the means for drawing said web.

13. In an apparatus for making and filling individual coffee bags, a pair of sealing rolls for drawing, partially making, permitting the bags to be filled and completing the sealing thereof, comprising two rolls having engaging gears driving the rolls at the same speeds, means mounting said rolls for rotation in bearings having spring yielding means permitting slight separation of said rolls, said rolls having end cylindrical band sections and means for spacing the surfaces of the band sections apart less than the thickness of the combined webs to be joined and central sections elongated in cross section having diametrically opposed cylindrical surface elements having equal radii whereby the surfaces thereof engage one another when the rolls are rotated, said cylindrical surface sections being smooth on one roll and serrated on the other and having a blade projecting from one surface lengthwise across the middle section thereof and a groove formed in the other surface corresponding thereto, said blade and groove when engaged exerting tension on said spring bearing whereby said cylindrical surface section and rolls momentarily become slightly separated at least partially severing a bag already formed and means provided in said blade and groove for holding the webs during separation of said rolls.

14. In an apparatus for making and filling individual coffee bags, means for delivering a predetermined measured quantity of coffee to the bags being made and filled including an enclosing shell, a drum rotatable in said shell having cylindrical recesses with axes coinciding with radii of said drum, a cup element slidably mounted in each said recess having a connecting supporting rod extending axially towards the center of said drum, a tapered shaft axially positioned in said drum with the tapered portion engaging the ends of said rods and means for longitudinally moving said tapered shaft whereby said cup elements may be simultaneously, axially slid in said recesses for adjusting the volume of said recesses.

15. In an apparatus for making and filling individual coffee bags, means for delivering a predetermined measured quantity of coffee to the bags being made and filled including an enclosing shell, a drum rotatable in said shell having cylindrical recesses with axes coinciding with radii of said drum, a cup element slidably mounted in each said recess having a supporting rod extending axially towards the center of said drum, means for supporting and rotating said drum coaxially thereof including a hollowed shaft, a tapered rod having a cap on one end engaging in said hollowed shaft, a helical spring in said hollowed shaft acting against said cap, said tapered rod axially extending through said drum with the tapered portion engaging the ends of said rods, and means for longitudinally moving said tapered shaft whereby said cup elements may be simultaneously, axially slid in said recesses for adjusting the volume of said recesses.

16. In an apparatus for making and filling individual coffee bags, means for delivering a predetermined measured quantity of coffee to the bags being made and filled including an enclosing shell, a drum rotatable in said shell having cylindrical recesses with axes coinciding with radii of said drum, a cup element slidably mounted in each said recess having a supporting rod extending axially towards the center of said drum, means for supporting and rotating said drum coaxially thereof including a hollowed shaft, a tapered rod having a cap on one end engaging in said hollowed shaft, a helical spring in said hollowed shaft acting against said cap, said tapered rod axially extending through said drum with the tapered portion engaging the ends of said rods, and means for longitudinally moving said tapered shaft for simultaneously, axially sliding said cup elements in said recesses whereby the volume of said recesses may be adjusted, comprising means keying said rod to said hollowed shaft, a threaded shaft having a handle at one end mounted axially in line with said rod, means coupling said threaded shaft to said rod permitting the free rotation of the latter and means for moving and locking said threaded shaft in a desired position according to the desired coffee volume to be delivered.

17. A method of making and filling individual coffee bags in a continuous process which comprises continuously feeding two paper webs, longitudinally double pleating one web twice with one double pleat occurring between one marginal edge and the center line of said web and the other double pleat occurring between the other marginal edge and the same center line of said one web, simultaneously double pleating the second paper web in the same way, transversely sealing said two webs together in face to face relation from one marginal edge to the other, thereby to form the bottom end seal of the bag with the double pleats of the two webs secured in said bottom end seal, drawing the marginal edges of said one web into face to face relation with the marginal edges of said second web and sealing the same together over a predetermined length of the webs to form the side seals of said bag, introducing a predetermined measure of coffee between said webs as said side seals are being formed, thereafter sealing said two webs together in face to face relation from one marginal edge to the other to form the top end seal of said bag with the double pleats of the two webs secured in said top end seal, and severing the bag from the two webs after completion of said top end seal and prior to the formation of the bottom seal of the next successive bag.

References Cited in the file of this patent

UNITED STATES PATENTS

| | | |
|---|---|---|
| 1,571,588 | Kelling | Feb. 2, 1926 |
| 1,887,680 | Hallman | Nov. 15, 1932 |
| 2,141,318 | Salfisberg | Dec. 27, 1938 |
| 2,169,936 | Wagner | Aug. 15, 1939 |
| 2,237,119 | Smith | Apr. 1, 1941 |
| 2,248,471 | Stroop | July 8, 1941 |
| 2,257,823 | Stokes | Oct. 7, 1941 |
| 2,374,504 | Salfisberg | Apr. 24, 1945 |
| 2,376,256 | Karlson | May 15, 1945 |
| 2,549,327 | Moule | Apr. 17, 1951 |

FOREIGN PATENTS

| | | |
|---|---|---|
| 81,360 | Germany | May 31, 1895 |